US012296963B2

(12) United States Patent
Grathwohl et al.

(10) Patent No.: US 12,296,963 B2
(45) Date of Patent: May 13, 2025

(54) ENVIRONMENTAL CONTROL SYSTEM INCLUDING MIXED-FLOW TURBINE

(71) Applicant: Hamilton Sundstrand Corporation, Charlotte, NC (US)

(72) Inventors: Nathan James Grathwohl, East Hartford, CT (US); Viktor Kilchyk, Lancaster, NY (US); Mark G. Vignali, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/075,054

(22) Filed: Dec. 5, 2022

(65) Prior Publication Data
US 2024/0182174 A1 Jun. 6, 2024

(51) Int. Cl.
*B64D 13/06* (2006.01)

(52) U.S. Cl.
CPC ...... *B64D 13/06* (2013.01); *B64D 2013/0618* (2013.01); *B64D 2013/0648* (2013.01)

(58) Field of Classification Search
CPC ...................................................... B64D 13/06
See application file for complete search history.

(56) References Cited

U.S. PATENT DOCUMENTS

| | | | |
|---|---|---|---|
| 6,148,622 A * | 11/2000 | Sanger | B64D 13/06 62/88 |
| 6,257,003 B1 * | 7/2001 | Hipsky | B64D 13/06 62/88 |
| 6,877,955 B2 * | 4/2005 | Higashimori | F01D 5/14 416/185 |
| 6,926,490 B2 * | 8/2005 | McAuliffe | B64D 13/06 415/28 |
| 7,251,942 B2 * | 8/2007 | Dittmar | F01D 15/10 60/788 |
| 8,678,752 B2 | 3/2014 | Delvaux et al. | |
| 8,967,528 B2 * | 3/2015 | Mackin | F02C 6/08 244/134 R |
| 10,137,993 B2 | 11/2018 | Bruno et al. | |
| 10,597,162 B2 * | 3/2020 | Bruno | F04D 29/5826 |
| 10,634,065 B2 * | 4/2020 | Bruno | F02C 6/08 |
| 2005/0284150 A1 | 12/2005 | Dittmar et al. | |
| 2015/0059397 A1 * | 3/2015 | Bruno | B64D 13/06 62/402 |
| 2015/0086396 A1 | 3/2015 | Nasir | |
| 2016/0376981 A1 | 12/2016 | Ullyott et al. | |
| 2017/0305559 A1 | 10/2017 | Bruno et al. | |
| 2019/0389587 A1 | 12/2019 | Bruno et al. | |

(Continued)

OTHER PUBLICATIONS

Extended European Search Report for European Application No. 23213774.5; Report Mail Date Mar. 22, 2024 (11 Pages).

(Continued)

*Primary Examiner* — Michael L Sehn
(74) *Attorney, Agent, or Firm* — CANTOR COLBURN LLP

(57) ABSTRACT

A system for a vehicle includes at least one inlet for receiving at least one medium and a device arranged in fluid communication with the at least one inlet. The device includes a shaft rotatable about a shaft axis, a compressor connected to the shaft, and a turbine connected to the shaft and also configured to drive the compressor upon receipt of the at least one medium. The turbine is a mixed-flow turbine.

10 Claims, 5 Drawing Sheets

(56) References Cited

U.S. PATENT DOCUMENTS

2021/0095576 A1\* 4/2021 Shinde .................... F01D 25/12
2022/0090506 A1 3/2022 Morita et al.

OTHER PUBLICATIONS

Leonard et al. "A numerical study of automotive turbocharger mixed flow turbine inlet geometry for off design performance" IOP Conference Series: Materials Science and Engineering, vol. 52, No. 4 (Dec. 20, 2013) (10 Pages).

\* cited by examiner

ENVIRONMENTAL CONTROL SYSTEM INCLUDING MIXED-FLOW TURBINE

BACKGROUND

Exemplary embodiments pertain to the art of thermal management of and, in particular, to thermal management of one or more loads of a vehicle.

A typical commercial aircraft includes at least several nonintegrated pressurization systems configured to provide temperature control to various regions of the aircraft. For example, an aircraft environmental control system primarily provides heating and cooling for the aircraft cabin area. In addition, a galley chiller system is dedicated to refrigerating the food carts in the galleys located throughout the aircraft. Since each system has a significant weight and power requirement, the overall efficiency of the aircraft is affected by these nonintegrated systems.

One or more of these pressurization systems may rely on ram or fresh air to condition, i.e., to cool or heat another medium. However, in applications where the aircraft is travelling at supersonic speeds, the temperature of the ram air may be too high to effectively remove heat from another load.

BRIEF DESCRIPTION

According to an embodiment, a system for a vehicle includes at least one inlet for receiving at least one medium and a device arranged in fluid communication with the at least one inlet. The device includes a shaft rotatable about a shaft axis, a compressor connected to the shaft, and a turbine connected to the shaft and also configured to drive the compressor upon receipt of the at least one medium. The turbine is a mixed-flow turbine.

In addition to one or more of the features described herein, or as an alternative, in further embodiments the device is a cabin air compressing device.

In addition to one or more of the features described herein, or as an alternative, in further embodiments the device is an air cycle machine.

In addition to one or more of the features described herein, or as an alternative, in further embodiments the at least one medium is provided to the compressor and the turbine in series.

In addition to one or more of the features described herein, or as an alternative, in further embodiments the at least one medium is provided to the compressor and the turbine in parallel.

In addition to one or more of the features described herein, or as an alternative, in further embodiments the at least one inlet further includes a first inlet and a second inlet and the at least one medium further includes a first medium provided from a first source and a second medium provided from a second source. The compressor is fluidly coupled to the first inlet and the turbine is fluidly coupled to the second inlet.

In addition to one or more of the features described herein, or as an alternative, in further embodiments the turbine further includes a turbine housing having an inlet opening and an outlet opening and a turbine rotor arranged within the turbine housing. The turbine rotor includes a hub having a plurality of turbine blades provided on an outer circumference of the hub.

In addition to one or more of the features described herein, or as an alternative, in further embodiments the at least one medium provided at the outlet opening has an axial flow configuration.

In addition to one or more of the features described herein, or as an alternative, in further embodiments the at least one medium provided to the inlet opening is arranged at an angle relative to a radial axis and the shaft axis.

In addition to one or more of the features described herein, or as an alternative, in further embodiments the angle between the at least one medium provided to the inlet opening and the radial axis is between about 5 degrees and about 60 degrees.

In addition to one or more of the features described herein, or as an alternative, in further embodiments the angle between the at least one medium provided to the inlet opening and the radial axis is between about 10 degrees and about 45 degrees.

In addition to one or more of the features described herein, or as an alternative, in further embodiments the angle between the at least one medium provided to the inlet opening and the radial axis is between about 15 degrees and about 40 degrees.

In addition to one or more of the features described herein, or as an alternative, in further embodiments the at least one medium is a flow of air.

In addition to one or more of the features described herein, or as an alternative, in further embodiments the at least one medium includes ram air.

In addition to one or more of the features described herein, or as an alternative, in further embodiments the at least one medium includes bleed air.

In addition to one or more of the features described herein, or as an alternative, in further embodiments the vehicle is an aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
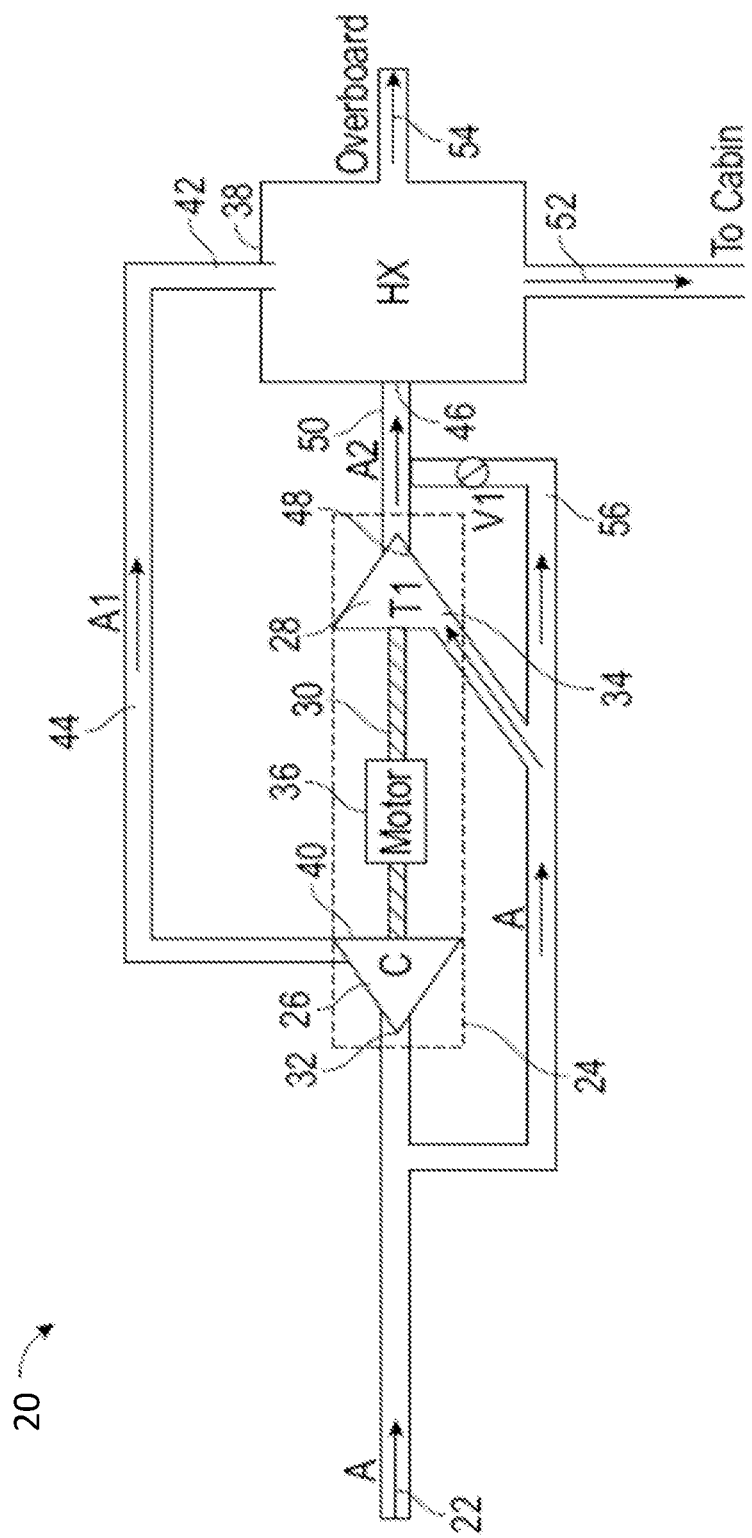
FIG. 1 is a schematic diagram of a portion of a pressurization system of a vehicle according to an embodiment.

With reference now to FIG. 1, a schematic diagram of a portion of an environmental control system, such as a pressurization system for example, is illustrated. The pressurization system 20 may be a refrigeration or air cycle subsystem and is configured to receive at least one medium A at an inlet 22. In the illustrated, non-limiting embodiment, the medium is flow of air, such as fresh air or outside air for example. This outside air, also referred to herein as RAM air, can be procured via one or more scooping mechanisms, such as an impact scoop or a flush scoop for example. When the pressurization system 20 is implemented on an aircraft, the medium A is generally at an ambient pressure equal to an air pressure outside of the aircraft when the aircraft is on the ground and is between an ambient pressure and a cabin pressure when the aircraft is in flight. It should be understood that any suitable medium A is within the scope of the disclosure. For example, other suitable mediums available on an aircraft include, but are not limited to bleed air, which is pressurized air originating from, i.e., being "bled" from, an engine or auxiliary power unit of the aircraft, or cabin discharge air, which is air leaving the cabin and that would typically be discharged overboard.

It should be understood that the elements of the pressurization system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the pressurization system 20 can be regulated to a desired value.

In the illustrated, non-limiting embodiment, the pressurization system 20 includes at least one cabin air compressing device 24. The cabin air compressing device 24 is a mechanical device that includes one or more components for performing thermodynamic work on a medium (e.g., extracts work from the medium by raising and/or lowering the pressure thereof and by raising and/or lowering the temperature thereof.)

In the illustrated, non-limiting embodiment, the cabin air compressing device 24 includes a compressor 26 and a turbine 28 operably coupled by a shaft 30. Accordingly, the cabin air compressing device 24 may also be referred to herein as a turboCAC. A compressor 26 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine 28 is a mechanical device that expands a medium and extracts work therefrom (also referred to as extracting energy) to drive the compressor 26 via the shaft 30. Although only a two-wheel cabin air compressing device 24 is illustrated and described herein, it should be understood that embodiments having additional wheels, such as an additional compressor, turbine, and/or fan for example, are also within the scope of the disclosure.

In the illustrated, non-limiting embodiment, an inlet 32 of the compressor 26 and an inlet 34 of the turbine 28 are both fluidly connected to the inlet 22. Accordingly, a first portion of the flow of medium A from the inlet 22 may be provided to the compressor inlet 32 and a second portion of the flow of medium A from the inlet 22 may be provided to the turbine inlet 34 in parallel.

In an embodiment, the cabin air compressing device 24 additionally includes an electric motor 36 connected to the shaft 30 and operable to drive the compressor 26. The motor 36 can receive power from a power source (not shown) such as generator or a power bus (e.g., a power bus of an aircraft). In embodiments including both a turbine 28 and a motor 36 connected to the shaft 30, either or all of the turbine 28 and the motor 36 may be used to drive the compressor 26.

The pressurization system 20 may include at least one cooling heat exchanger 38 arranged downstream from at least one of the compressor 26 and the turbine 28 relative to a flow of medium through the pressurization system 20. In the illustrated, non-limiting embodiment, the cooling heat exchanger 38 is configured to receive and cool a flow of compressed medium A1 output from the compressor 26. As shown, an outlet 40 of the compressor 26 is connected to a first or heated flow inlet 42 of the heat exchanger via a conduit 44. The compressed medium A1 is cooled within the heat exchanger 38 by a cooling medium provided at a second or cooling flow inlet 46. In the illustrated, non-limiting embodiment, the cooling medium is the expanded medium A2 provided at the outlet 48 of the turbine 28, the outlet 48 being connected to the cooling flow inlet 46 via a conduit 50. Although the heat exchanger 38 is illustrated in FIG. 1 as a cross-flow heat exchanger, a skilled artisan will realize that the heat exchanger 38 can be any suitable type of heat exchanger that achieves the desired result of cooling the compressed medium A1.

The cooling heat exchanger 38 additionally includes a first or heated flow outlet 52 and a second or cooling flow outlet 54. In an embodiment, the first heated flow outlet 52 of the heat exchanger 38 is fluidly coupled to a volume of the vehicle, such as a cabin for example. The first heated flow outlet 52 may be directly connected to a volume, such as via a conduit, or alternatively, the flow at the first heated flow outlet 52 may be provided to at least one component, such as of an environmental control system (ECS), operable to condition the compressed medium A1 for example, before it is delivered to the volume. The heated expanded medium A2 provided at the second cooling flow outlet 54 is exhausted overboard to the ambient atmosphere surrounding the vehicle. In an embodiment, the expanded medium A2 may be exhausted overboard directly from the second cooling flow outlet 54, or may be provided to one or more other components before ultimately being exhausted overboard.

During operation of the pressurization system 20 in a first mode when the vehicle is at a high altitude, such as during a supersonic cruise condition for example, a first portion of the medium A provided at the inlet 22 is provided generally directly to the inlet 32 of the compressor 26. The act of compressing the medium A, heats the medium A and increases the pressure of the medium A. At the same time, a second portion of the flow of medium A from the inlet 22 is provided to the inlet 34 of the turbine 28. Within the turbine 28, the medium A is expanded and work is extracted therefrom. The work extracted from the medium A within the turbine 28 is used to drive the compressor 26. However, it should be understood that embodiments where the aircraft is not flying in a supersonic condition, the motor 36 may be used in combination with the energy extracted at the turbine to drive the compressor 26. The expanded medium A2 output from the turbine 28 has a reduced temperature and pressure relative to the medium A provided to the inlet 34 of the turbine 28.

The compressed medium A1 output from the outlet 40 of the compressor 26, represented as A1, may then flow to the heated flow inlet 42 of the cooling heat exchanger 38. Similarly, the expanded medium output from the turbine 28, represented as A2, may then flow to the cooling flow inlet 46 of the cooling heat exchanger 38. Within the cooling heat exchanger 38, heat from the compressed medium A1 is transferred to the cooling medium A2, before the cooling medium A2 is exhausted overboard, such as via the second cooling flow outlet 54 for example, into the ambient atmosphere adjacent to the vehicle. As previously described, the compressed medium A1 provided at the heated flow outlet 52 of the cooling heat exchanger 38 is then provided to the volume or to one or more other components arranged upstream from the volume and configured to further condition the compressed medium A1.

A second mode of operation of the pressurization system 20 is substantially similar to the first mode of operation. However, in the second mode, a valve V1 arranged within a bypass conduit 56 is opened such that at least some, and in some embodiments all of the second portion of the flow A bypasses the turbine 28 via the bypass conduit 56. In such embodiments, the cooling medium provided to the second cooling flow inlet 46 of the cooling heat exchanger 38 is either the medium A or a combination of the expanded medium A2 and the medium A.

Although the compressor 26 and the turbine 28 are illustrated and described herein as part of a CAC 24, it should be appreciated that any device including an air driven turbine is within the scope of the disclosure. In an embodiment, best shown in FIG. 2, the compressor 26 and the turbine 28 operably coupled by shaft 30 are part of an air cycle machine 60 of an environmental control system. In such embodiments, the compressor 26 may be considered a first wheel of the air cycle machine 60 and the turbine 28 may be considered a second wheel thereof. Further, one or more additional wheels (not shown), such as another compressor, turbine, and/or a fan for example, may also be mounted to the shaft 30 for rotation about the axis.

Figure 2:
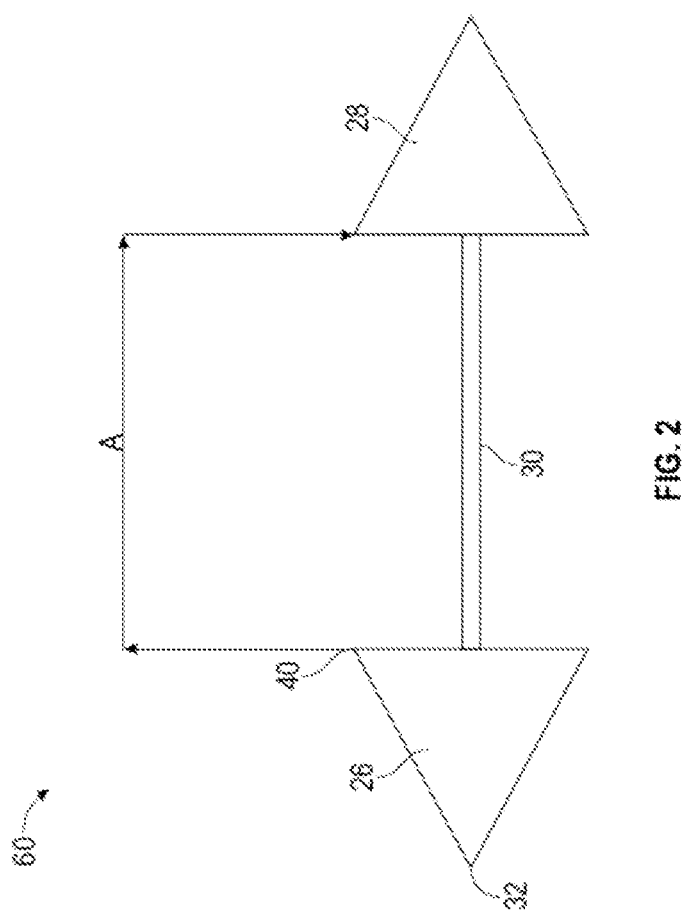
FIG. 2 is a schematic diagram of an air cycle machine according to an embodiment.

Similar to the CAC 24 previously described, energy extracted from a medium within the turbine 28 may be used to drive the compressor 26. Although not shown, in embodiments where the turbine 28 is part of an air cycle machine, a motor may alternatively or additionally be used to drive rotation of the shaft 30 and therefore the compressor 26. It should be understood that the medium or fluid provided to and compressed within the compressor 26 may, but need not be the same medium or fluid provided to the turbine 28 of the air cycle machine 60. In such embodiments, as shown in FIG. 2, the outlet 40 of the compressor 26 may be fluidly coupled to an inlet 34 of the turbine 28 or another wheel of the air cycle machine 60. Alternatively, the system may include a plurality of inlets, each configured to receive a medium from a different source. Accordingly, in an embodiment, a first medium or fluid (from a first source) may be provided to the compressor 26 from a first inlet and a second medium (from a second source), different from the first medium, may be provided to the turbine 28 of the air cycle machine 60 from a second inlet. In such embodiments, the second medium may originate from a different source than the first medium.

Figure 3:
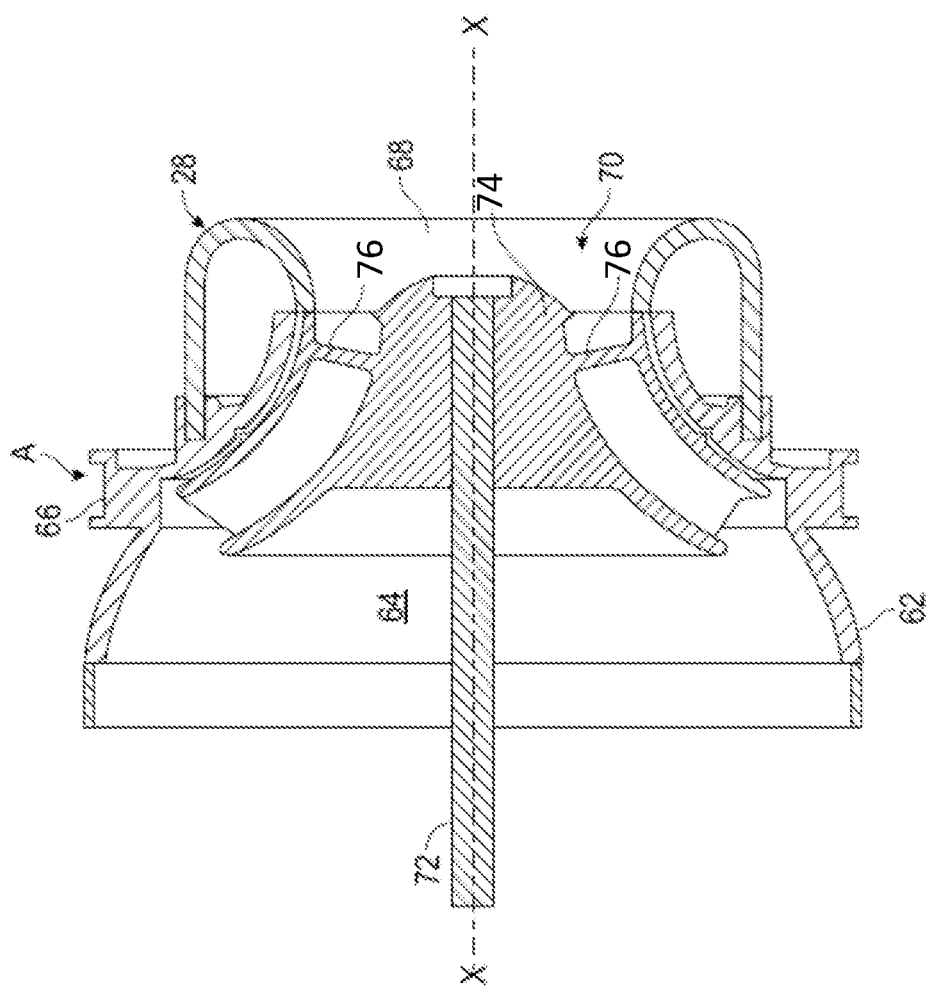
FIG. 3 is a cross-sectional view of a turbine according to an embodiment.

With reference now to FIG. 3, an example of a turbine 28, such as suitable for use in either the CAC 24 of FIG. 1 or the air cycle machine 60 of FIG. 2, is illustrated in more detail. As shown, the turbine 28 includes a turbine housing 62 having a hollow interior 64 and including an inlet opening 66 and an outlet opening 68. A turbine rotor 70 is arranged within the hollow interior 64 of the turbine housing 62 at a position between the inlet opening 66 and the outlet opening 68. The turbine rotor 70 is mounted to a shaft 72 and includes a hub 74 having a plurality of turbine blades 76 arranged at an outer circumference of the hub 74 and extending radially outwardly therefrom. In the illustrated, non-limiting embodiment, the turbine blades 76 are substantially identical and are equidistantly spaced about the hub 74 to achieve a uniform rotation of the turbine rotor 70. However, embodiments where a configuration of the turbine blades 76 varies and/or where the turbine blades are non-uniformly spaced are also contemplated herein. A plurality of channels 78 are defined between adjacent turbine blades 76 and may be bounded at least partially by an adjacent surface of the turbine housing 62. In operation, the flow of a medium, such as medium A, flows through the inlet opening 66 and into a first end or inlet 77 of each of the plurality of channels 78 defined between the plurality of turbine blades 76 and the turbine housing 62. Upon reaching the second or outlet end of each of the plurality of channels 78, the flows merge together and are directed through the outlet opening 68 of the turbine housing 62. As the flow passes through each of the plurality of channels 78, the flows are configured to impart a motion to the turbine rotor 70 causing the turbine rotor 70 and the shaft 72 coupled to the turbine rotor 70 to rotate about its axis.

Figure 4:
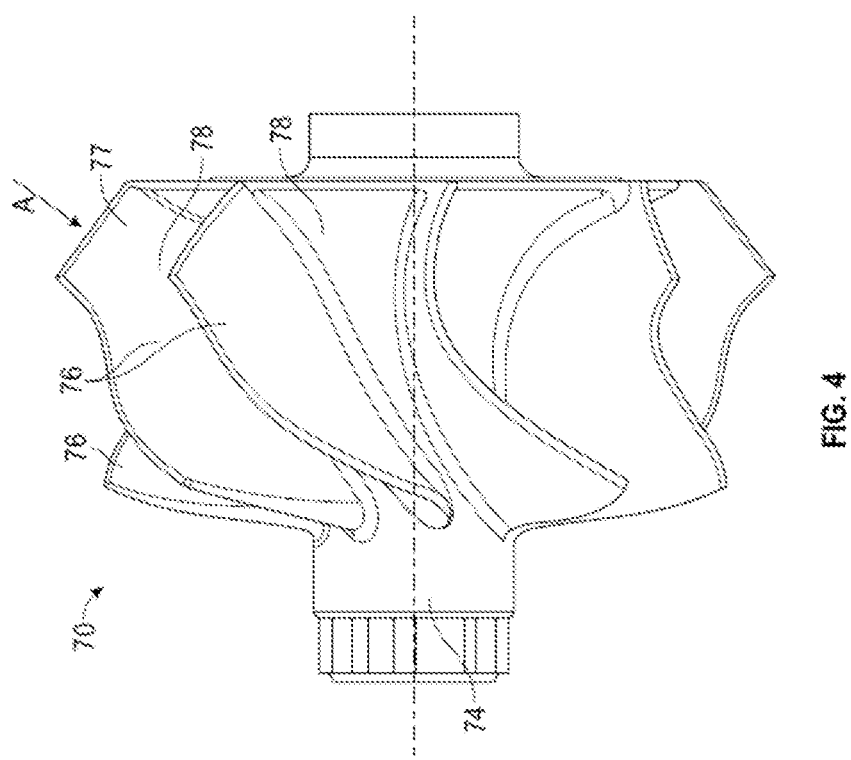
FIG. 4 is a perspective view of a mixed flow turbine rotor according to an embodiment.
Figure 5B:
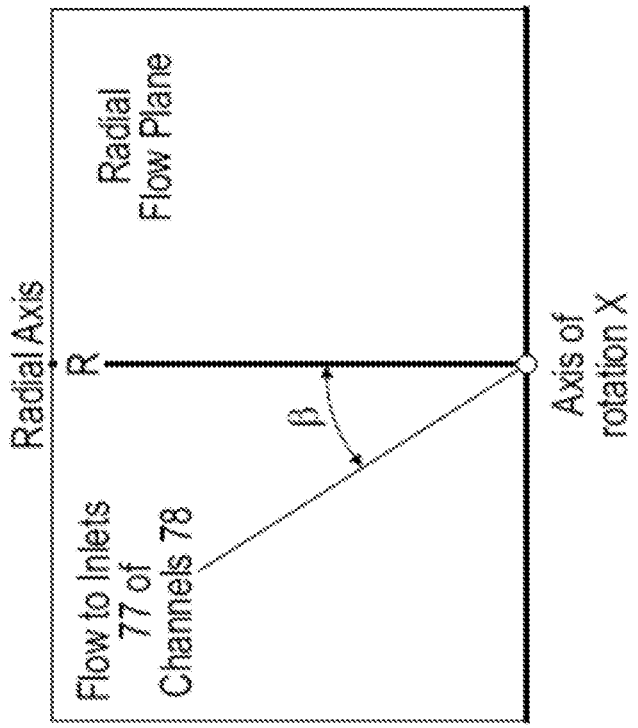
FIG. 5B is a graphical representation of an angle of an inlet of the plurality of channels of a turbine relative to a radial flow configuration and an axial flow configuration according to an embodiment.
Figure 5A:
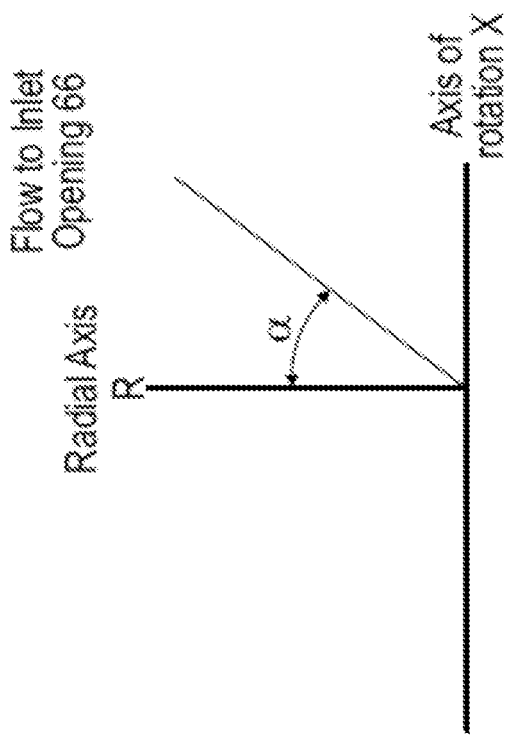
FIG. 5A is a graphical representation of an angle of the inlet opening relative to a radial flow configuration and an axial flow configuration according to an embodiment.

In an embodiment, the turbine 28 is configured as a "mixed-flow" turbine. In a mixed-flow turbine configuration, the flow provided at the outlet opening 68 formed in the turbine housing 62 may have an axial configuration. However, the inlet opening 66 formed in the turbine housing 62, and therefore the flow provided to the inlet opening 66, is arranged at an angle relative to both an axial flow configuration and a radial flow configuration. With reference to FIG. 4 and FIG. 5A, in the illustrated, non-limiting embodiment, the inlet opening 66 is arranged at an angle relative to a horizontally oriented axis of rotation X or the shaft axis (defining the axial flow configuration). The inlet opening 66 is also arranged at an angle relative to a vertical radial axis (defining the radial flow configuration) R that is oriented perpendicularly or normal to the axis of rotation (radial flow configuration). As shown, the inlet opening 66, and therefore the flow provided to the inlet opening 66, is arranged within the plane defined by the axis of rotation X and the radial axis R at an angle $\alpha$ relative to the radial axis R. In an embodiment, the angle $\alpha$ is between about 5 degrees and about 60 degrees, and in some embodiments may be between about 10 degrees and about 45 degrees, between about 15 degrees and about 40 degrees, or between about 20 degrees and about 35 degrees for example. Although the inlet flow is illustrated as being arranged at a first side of the radial axis R, it should be understood that embodiments where the angle $\alpha$ is a negative angle, and therefore is arranged at the second, opposite side of the radial axis R are also contemplated herein.

As noted above, the inlet opening 66 and the inlet flow provided thereto is illustrated as being generally arranged within the plane defined by the axis of rotation and the radial axis, as shown in FIG. 5A. It should be understood that the inlet opening 66 and/or the inlets 77 of the plurality of channels 78 may be offset from or arranged at an angle $\beta$ relative to the plane defined by the axis of rotation X and the radial axis R (see FIG. 5B). This angle $\beta$, also referred to as a blade inlet angle, may be determined by the configuration of the inlet 77 of the plurality of channels 78 between adjacent turbine blades 76. Although the blade inlet angle $\beta$ is commonly 90° in turbines, embodiments where the turbine blades 76 have a forward sweep or a backward sweep configuration are also contemplated herein. It should therefore be understood that the orientation of the inlet opening 66 or inlets 77 of the plurality of channels and the inlet flow provided to the inlet opening 66 or inlets 77 may be arranged at angle relative to the radial axis.

It should be appreciated that the orientation of the inlet opening 66 and/or the configuration of the plurality of turbine blades 76 that receive the inlet flow from the inlet opening 66 may be varied based on the specific application. In an embodiment, the orientation of the inlet flow provided to the inlet opening 66 and/or the configuration of the plurality of turbine blades 76 is selected for application having a specific speed or equal to or greater than 120. Because a mixed flow turbine is capable of receiving a flow having a greater flow rate than a similarly sized radial flow turbine, a mixed flow turbine may be particularly suited for applications where the vehicle, such as an aircraft for example, can reach supersonic speeds, and convert the supersonic flow of medium provided to the turbine of the CAC device 24 or air cycle machine 60 to a flow having a subsonic speed.

By using a mixed flow turbine, the overall operating efficiency of the CAC 24 or the air cycle machine 60 may be improved. Further, when used in combination with a radial flow compressor, the overall size envelope and weight of the compress-turbine is reduced compared to the alternative radial turbine and radial compressor. In addition, a mixed flow turbine as described herein can be easily adapted to have a dual inlet allowing for two distinct flows to be simultaneously expanded, and energy extracted therefrom, allowing for wider range of high efficiency operation.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for a vehicle comprising:
   a plurality of inlets for receiving a plurality of mediums, respectively;
   a device arranged in fluid communication with at least a first inlet of the plurality of inlets, the first inlet configured to receive a flow of a first medium of the plurality of mediums, wherein the first medium is fresh air, the device comprising:
      a shaft rotatable about a shaft axis;
      a compressor connected to the shaft, the compressor being fluidly connected to a and configured to receive the flow of the first medium from the first inlet of the plurality of inlets;
      a turbine connected to the shaft, wherein the turbine is fluidly connected to only the first inlet of the plurality of inlets such that only a first medium of the plurality of mediums is provided to a turbine inlet, the turbine being configured to drive the compressor using energy extracted from the first medium, wherein the turbine is a mixed-flow turbine and the turbine and the compressor are fluidly connected to the first inlet of the plurality of inlets in parallel;
   a heat exchanger arranged downstream from an outlet of the compressor and from an outlet of the turbine, the heat exchanger having a first inlet fluidly connected to and configured to receive the flow of first medium from the compressor and the heat exchanger having a second inlet fluidly connected to and configured to receive the first medium from the outlet of the turbine.

2. The system of claim 1, wherein the device is a cabin air compressing device.

3. The system of claim 1, wherein the device is an air cycle machine.

4. The system of claim 1, wherein the turbine further comprises:
   a turbine housing having the turbine inlet including an inlet opening and a turbine outlet including an outlet opening;
   a turbine rotor arranged within the turbine housing, the turbine rotor including a hub having a plurality of turbine blades provided on an outer circumference of the hub.

5. The system of claim 4, wherein the first medium provided at the outlet opening has an axial flow configuration.

6. The system of claim 4, wherein the first medium provided to the inlet opening is arranged at an angle to a radial axis and the shaft axis.

7. The system of claim 6, wherein the angle between the first medium provided to the inlet opening and the radial axis is between about 5 degrees and about 60 degrees.

8. The system of claim 7, wherein the angle between the first medium provided to the inlet opening and the radial axis is between about 10 degrees and about 45 degrees.

9. The system of claim 7, wherein the angle between the first medium provided to the inlet opening and the radial axis is between about 15 degrees and about 40 degrees.

10. The system of claim 1, wherein the vehicle is an aircraft.

* * * * *